United States Patent
Coppola et al.

(10) Patent No.: US 10,556,482 B2
(45) Date of Patent: Feb. 11, 2020

(54) VASCULAR STRUCTURES AND METHODS FOR THERMAL CONTROL

(71) Applicant: GM GLOBAL TECHNOLOGY OPERATIONS LLC, Detroit, MI (US)

(72) Inventors: Anthony M. Coppola, Rochester Hills, MI (US); Rashmi Prasad, Troy, MI (US); Derek F. Lahr, Howell, MI (US); Fang Dai, Troy, MI (US); Michelle H. Wiebenga, Farmington Hills, MI (US); Ryan Gergely, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 15/705,568

(22) Filed: Sep. 15, 2017

(65) Prior Publication Data
US 2019/0084370 A1    Mar. 21, 2019

(51) Int. Cl.
*B60H 1/00* (2006.01)
*B60K 37/04* (2006.01)

(52) U.S. Cl.
CPC ....... *B60H 1/0055* (2013.01); *B60H 1/00295* (2019.05); *B60H 1/00321* (2013.01); *B60H 1/00564* (2013.01); *B60H 1/00571* (2013.01); *B60K 37/04* (2013.01); *B60H 2001/00078* (2013.01)

(58) Field of Classification Search
CPC ..... B60H 1/0055; B60H 1/00321; F28F 3/12; F28F 3/14
USPC ............ 165/168, 169, 170, 202; 237/12.3 B, 237/12.3 R
See application file for complete search history.

(56) References Cited

U.S. PATENT DOCUMENTS

| | | | | |
|---|---|---|---|---|
| 1,824,921 A | * | 9/1931 | Oishei | B60H 1/18 126/19.5 |
| 3,455,595 A | * | 7/1969 | Eggert, Jr. | B60H 1/0055 296/208 |
| 3,695,679 A | * | 10/1972 | Wilfert | B60J 1/2005 296/91 |
| 3,719,135 A | * | 3/1973 | Breitschwerdt | B60H 1/00028 454/158 |
| 3,753,462 A | * | 8/1973 | Burger | B60H 1/00007 165/204 |
| 4,168,740 A | * | 9/1979 | Cairenius | F24D 3/14 165/49 |
| 4,662,561 A | * | 5/1987 | Dietzsch | B60H 1/00328 165/170 |

(Continued)

OTHER PUBLICATIONS

Dong, H., et al. "Chemical Treatment of Poly(lactic acid) Fibers to Enhance the Rate of Thermal Depolymerization", ACS, Applied Materials & Interfaces, 2012, pp. 503-509, vol. 4.

(Continued)

*Primary Examiner* — Claire E Rojohn, III
(74) *Attorney, Agent, or Firm* — Lorenz & Kopf, LLP

(57) ABSTRACT

Systems and methods are provided for thermal control using vascular channels. Vascular channels are incorporated in a network within a component. The component is a part of a manufactured environment configured for occupants. A fluid circuit is connected with the vascular channels and circulates a fluid through the component to alter a thermal state of the component.

11 Claims, 16 Drawing Sheets

(56) References Cited

U.S. PATENT DOCUMENTS

| | | | | |
|---|---|---|---|---|
| 7,264,046 B1* | 9/2007 | Futernik | ............ | B60H 1/00435 |
| | | | | 165/202 |
| 10,155,547 B1* | 12/2018 | Coppola | ................ | B62D 25/12 |
| 2010/0314081 A1* | 12/2010 | Reis | ........................ | F28D 1/047 |
| | | | | 165/134.1 |
| 2011/0042988 A1* | 2/2011 | Alpert | .................. | B60H 1/2218 |
| | | | | 296/24.3 |
| 2012/0291991 A1* | 11/2012 | Denkenberger | ..... | B21D 53/045 |
| | | | | 165/81 |
| 2013/0032307 A1* | 2/2013 | Line | .................. | B60H 1/00207 |
| | | | | 165/41 |
| 2019/0084370 A1* | 3/2019 | Coppola | ............ | B60H 1/00321 |

OTHER PUBLICATIONS

Esser-Kahn, A. P., et al. "Three-Dimensional Microvascular Fiber-Reinforced Composites", Advanced Materials, 2011, pp. 3654-3658, vol. 23.

* cited by examiner

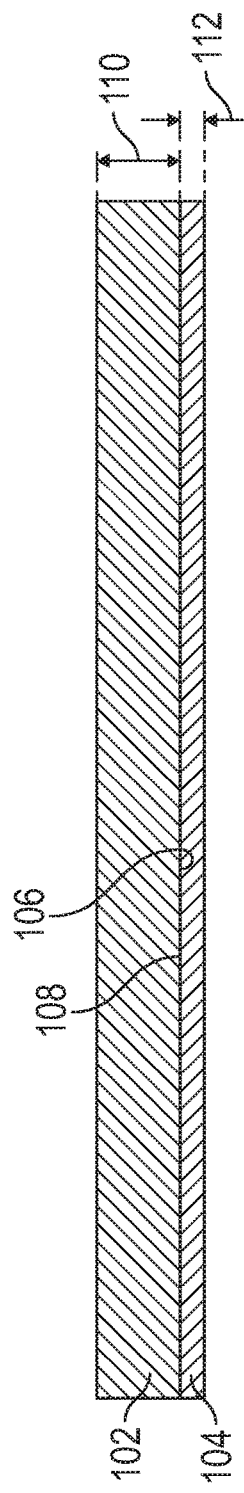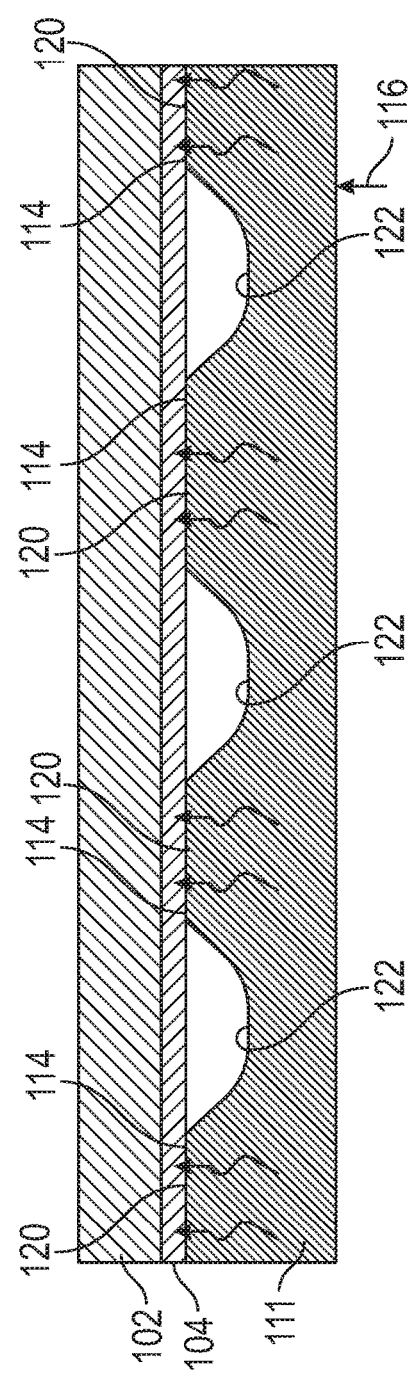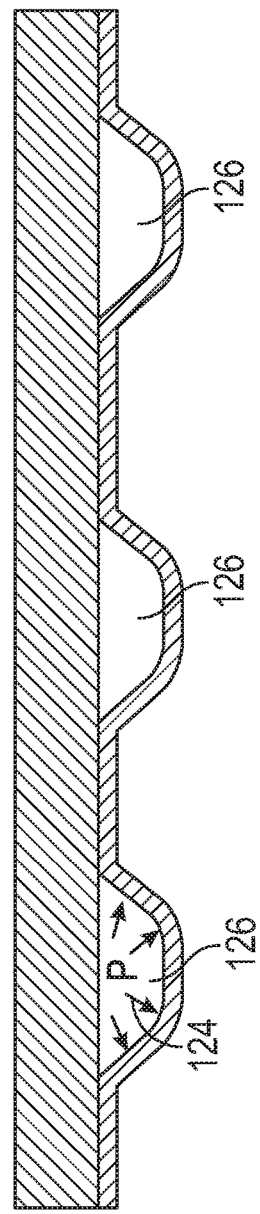

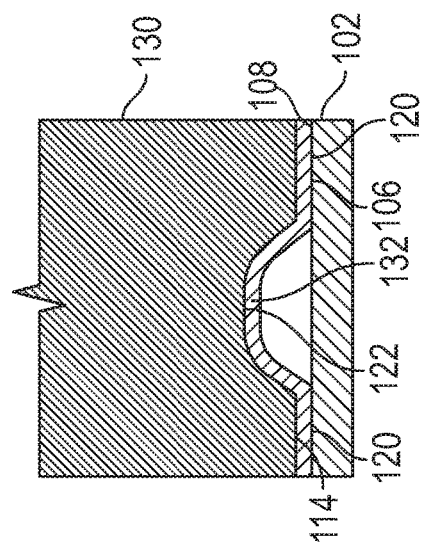
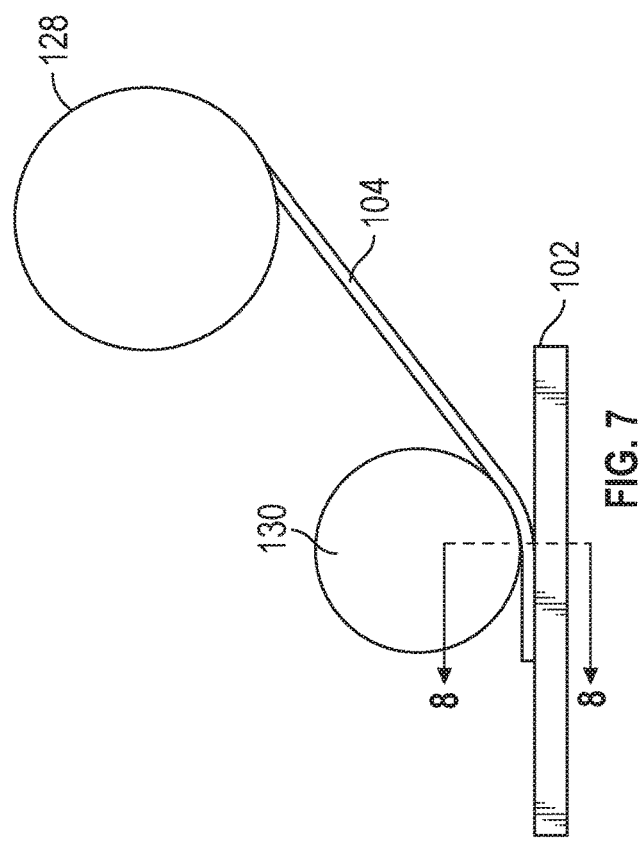
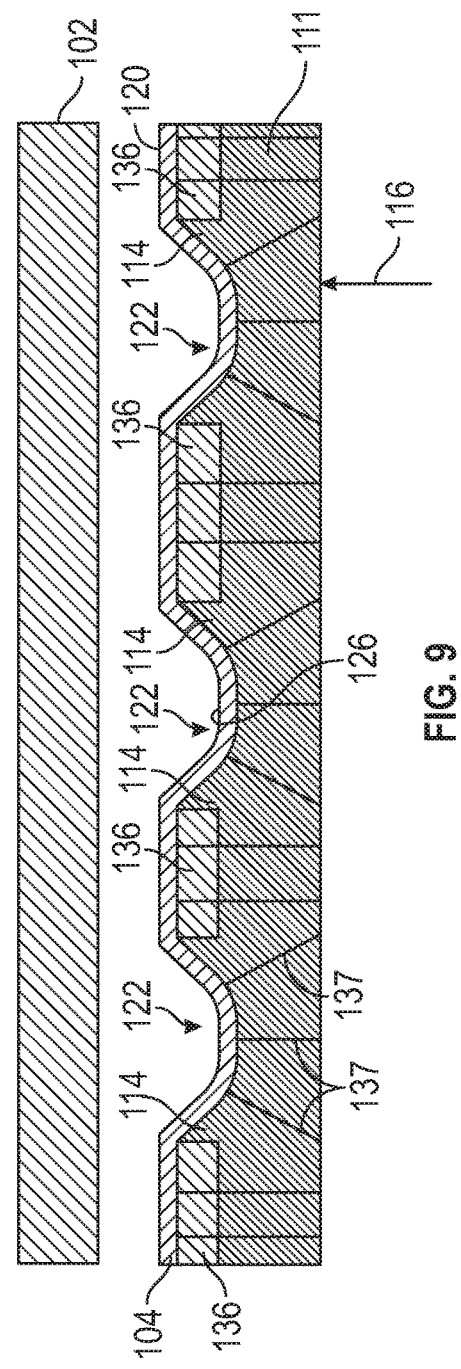

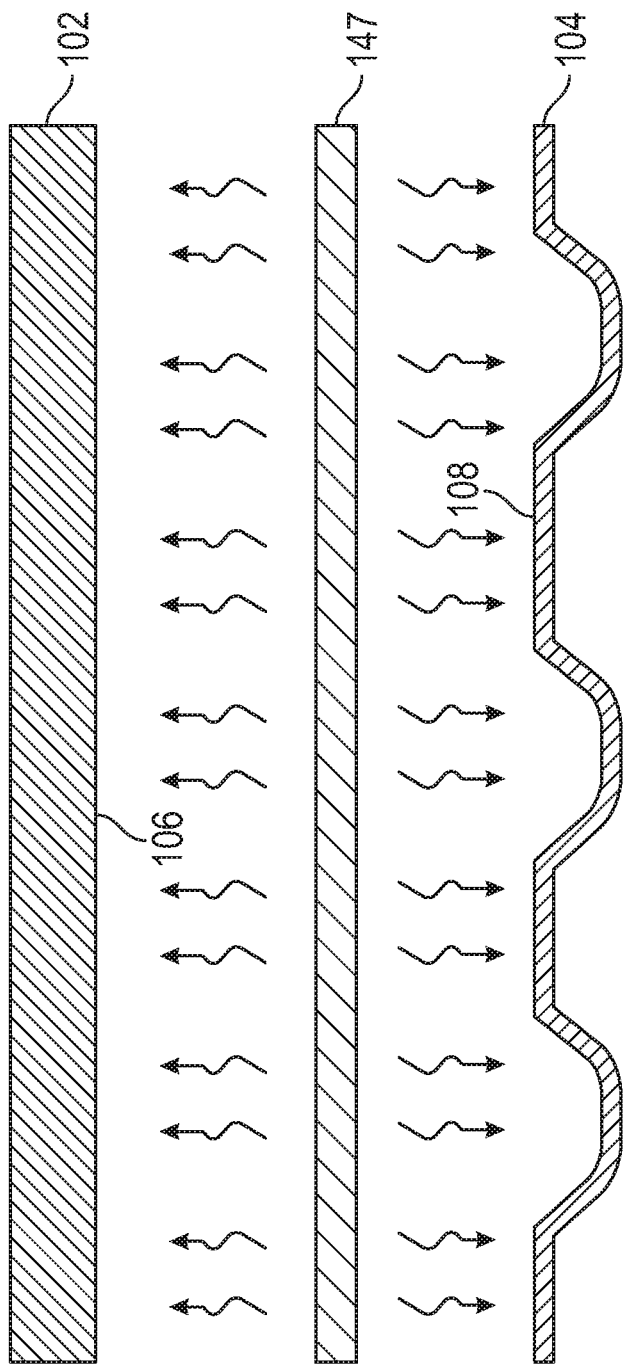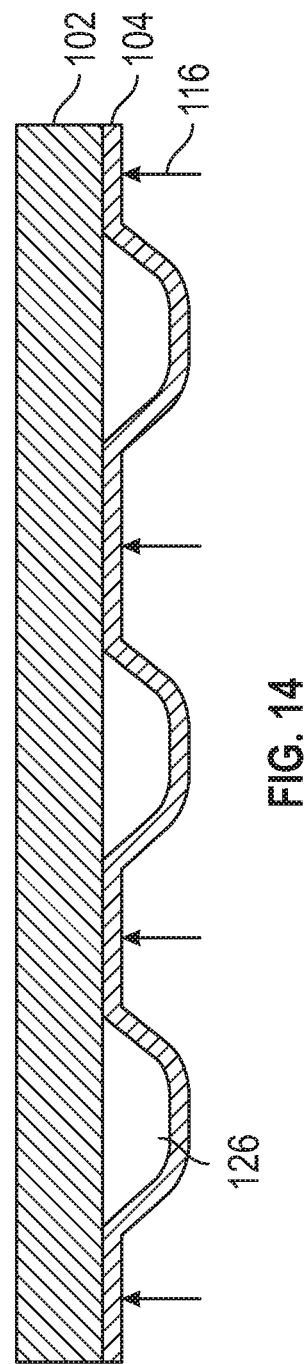

VASCULAR STRUCTURES AND METHODS FOR THERMAL CONTROL

INTRODUCTION

The present disclosure generally relates to structures and methods for thermal control using vascular channels and more particularly, relates to heating or cooling through vascular channels formed in interior components.

Assembled structures may include components made of various different shapes and materials. The individual components may conduct heat, may radiate heat, and/or may draw heat away from other objects. When components define a manufactured space that is occupied by people, the space is generally climatically controlled using a heating, ventilation and air conditioning (HVAC) system. Providing a HVAC system enables maintaining a comfortable environment for occupants by adding or removing heat from the space. The HVAC system therefore works to counter unwanted heat or cold. When components are the source of the heat or cold, the HVAC system only indirectly addresses those sources by conditioning internal air. In certain applications, a HVAC system may have limited capacity. In other applications, reducing energy usage of a HVAC system is desirable.

Accordingly, it is desirable to provide structures and methods that efficiently and effectively provide heating and/or cooling for a broad range of applications. Furthermore, other desirable features and characteristics of structures and methods for thermal control will become apparent from the subsequent detailed description and the appended claims, taken in conjunction with the accompanying drawings and the foregoing technical field and background.

SUMMARY

Systems and methods are provided for thermal control using vascular channels. In various exemplary embodiments, vascular channels are incorporated in a network within a component. The component is a part of a manufactured environment configured for occupants. A fluid circuit is connected with the vascular channels and circulates a fluid through the component to alter a thermal state of the component.

In additional embodiments, the manufactured environment includes a cabin of a vehicle and the component includes an interior panel of the vehicle.

In additional embodiments, the fluid circuit includes a heat exchanger. A HVAC system is configured to circulate a second fluid through the heat exchanger.

In additional embodiments, the component includes a vehicle dashboard.

In additional embodiments, the component includes a vehicle windshield.

In additional embodiments, the vascular channels have a diameter between 100 micrometers and one millimeter.

In additional embodiments, the vascular channels include tubes embedded in the component.

In additional embodiments, the network includes a manifold connected with the vascular channels.

In additional embodiments, the component is made of a fiber material incorporated in a polymer matrix.

In additional embodiments, the fluid circuit includes a heat exchanger. A HVAC system circulates engine coolant through the heat exchanger and through a coolant circuit of the HVAC system. The fluid circuit includes another heat exchanger. An air conditioning system circulates a refrigerant through the additional heat exchanger.

In other exemplary embodiments, a method for thermal control of a component includes incorporating vascular channels in a network within the component. The component is assembled as a part of a manufactured environment configured for occupants. A fluid circuit is connected with the vascular channels. A fluid is circulated through the component, altering a thermal state of the component.

In additional embodiments, a method includes configuring the manufactured environment as a cabin of a vehicle. A component may be configured as an interior panel of the vehicle.

In additional embodiments, a method includes connecting a heat exchanger in the fluid circuit; and circulating a second fluid through the heat exchanger and through a HVAC system.

In additional embodiments, a method includes configuring the component as a vehicle dashboard.

In additional embodiments, a method includes configuring the component as a vehicle windshield.

In additional embodiments, a method includes forming the vascular channels with a diameter between 100 micrometers and one millimeter.

In additional embodiments, a method includes forming the vascular channels as tubes, and embedding the tubes in the component.

In additional embodiments, a method includes connecting a manifold with the vascular channels, and incorporating the manifold into the component.

In additional embodiments, a method includes forming the component of a fiber material incorporated in a polymer matrix.

Additional exemplary embodiments include a thermal control system for a cabin of a vehicle. A component of the vehicle defines an interior part of the cabin. A fluid circuit circulates a fluid. A vascular channel in the component is connected with the fluid circuit to channel the fluid through the component. A heat exchanger is carried by the vehicle and is included in the fluid circuit. The cabin is configured to carry an occupant and the fluid is configured to alter a thermal state of the component to increase or decrease a temperature sensed by the occupant.

BRIEF DESCRIPTION OF THE DRAWINGS

The exemplary embodiments will hereinafter be described in conjunction with the following drawing figures, wherein like numerals denote like elements, and wherein:

FIG. 4 is a schematic cross sectional illustration of a component, in accordance with an embodiment;

FIG. 5 is a schematic cross sectional illustration of the component of FIG. 4 with an applied die, in accordance with an embodiment;

FIG. 6 is a schematic cross sectional illustration of the component of FIG. 4 with formed vascular channels, in accordance with an embodiment;

FIG. 7 is a schematic illustration of a sheet application process for a component, in accordance with an embodiment;

FIG. 8 is a schematic cross sectional illustration taken generally through the line 8-8 of FIG. 7, in accordance with an embodiment;

FIG. 9 is a schematic illustration of a component and a die, in accordance with an embodiment;

FIG. 13 is a schematic cross sectional illustration of a component heating operation, in accordance with various embodiments;

FIG. 14 is a schematic illustration of the component of FIG. 13 with formed vascular channels, in accordance with an embodiment;

DETAILED DESCRIPTION

Figure 1:
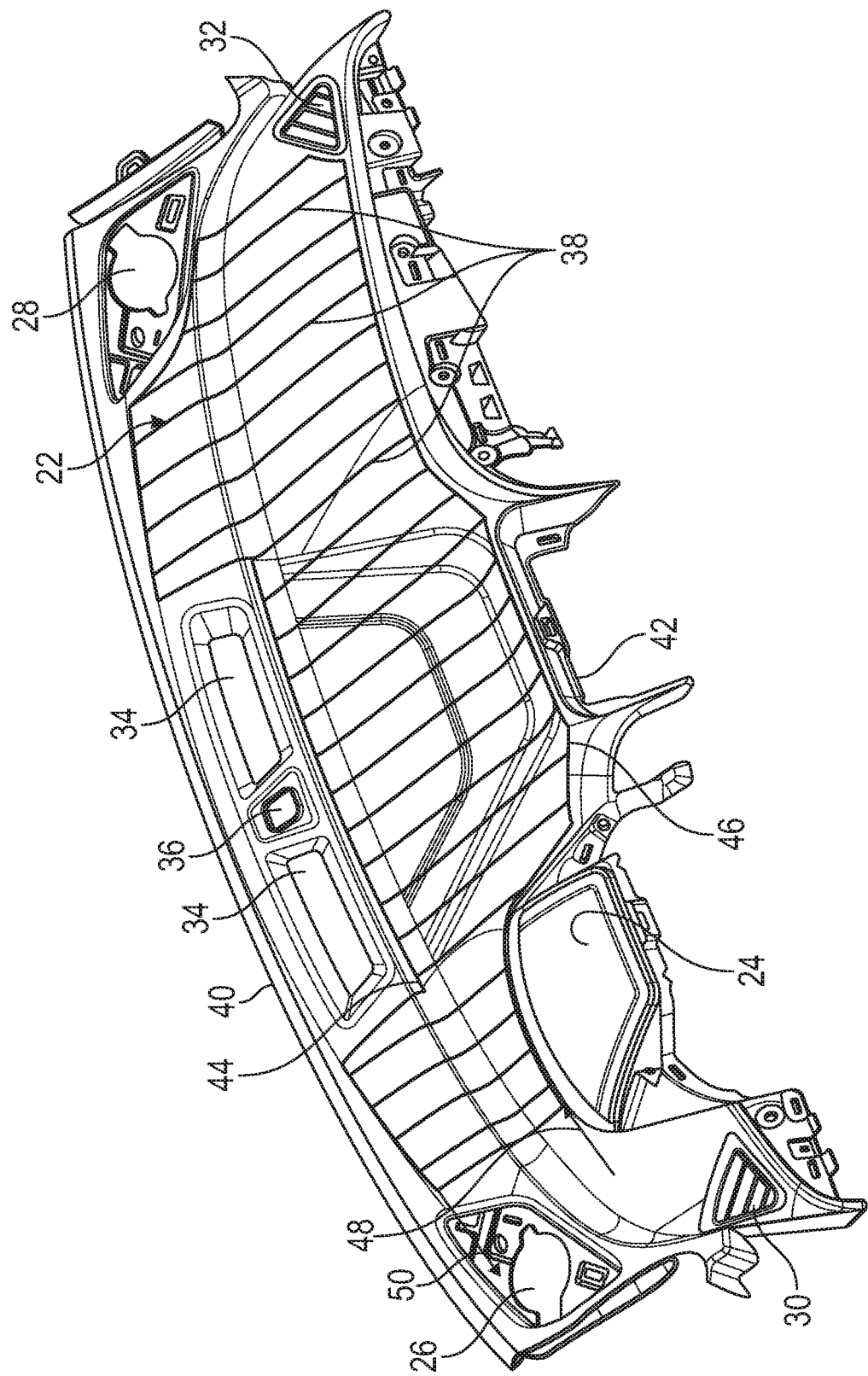
FIG. 1 is a schematic illustration of a component with vascular channels, in accordance with an embodiment.

The following detailed description is merely exemplary in nature and is not intended to limit the subject matter of the application or its uses. Furthermore, there is no intention to be bound by any expressed or implied theory presented in the preceding introduction, summary or the following detailed description.

In accordance with preferred embodiments described herein, the sensed temperature of a manufactured environment is altered by the incorporation of vascular channel fluid circulation systems and methods in certain components. In manufactured environments such as the cabin of an automobile, heat sinks and heat loads such as of conductive and radiant sources, influence the temperatures that an occupant experiences. To improve thermal comfort of occupants in economical ways, the temperature of components is changed by the circulation of fluids through vascular channels. The vascular channels range in size, which depends on the application and the manufacturing method selected to form a component. Generally, the vascular channels range in size from 100 microns to five millimeters in diameter, although other sizes may be used. Heat may be added or removed through the vascular channels. Excess heat, such as from solar loading, propulsion systems, battery systems, electronics and various vehicle systems may be extracted and dissipated to the environment. Heat may be added through incorporated vascular channels to warm cold components, such as for seating or other occupant interface surfaces, windows, or other components. Vascular channel heating and cooling may be used to supplement a HVAC system, and enables reducing the size of energy consuming HVAC components, increasing efficiency. Size and weight reductions are also enabled for various systems that are used to dissipate heat such as an engine radiator, an air conditioning condenser, a transmission cooler and a battery cooler. These aspects are useful in all applications including electric vehicle applications.

Accordingly, the following description relates to vascular structures, systems and methods for thermal control. The structures, systems and methods may be described in the context of vehicular applications for purposes of demonstrating examples. A vehicle is but one type of manufactured environment where vascular channel heating and/or cooling may be implemented. The present disclosure is not limited to vehicle applications, but rather, also encompasses any application where thermal control is desired and where components exist for the application of vascular channels. Accordingly, the teachings of the present disclosure can be applied to vehicles or to other applications, as desired.

In an exemplary embodiment, such as within a vehicle cabin, the comfort of an occupant is influenced not only by the air temperature inside the vehicle but also by a variety of radiative and conductive sources. Radiative sources include those that surround the occupant such as the windshield/windows, visor, dashboard, door panels, seats, flooring, and others. Conductive sources include those that the occupant contacts such as seating surfaces, the steering wheel, armrests, and others. These sources increase the heat load experienced by the occupant on a hot day, and particularly the conductive sources influence the heat loss experienced by the occupant on a cold day. Accordingly, the occupant experience is improved by altering the temperature of various component sources through vascular channel heating and/or cooling.

In an example as illustrated in FIG. 1, a component 20 in the form of a dashboard for an automobile includes network 22, which is a vascular channel network. The network 22 is incorporated into the component 20, such as by using one of the methods described below. The component 20 is sized and shaped to fit its packaging space and functional requirements of the automobile and includes a contoured surface 24. It will be appreciated that the network 22 is shown for description purposes but in application may be embedded under the surface 24, and therefore not visible. The component 20 also includes features such as speaker openings 26, 28, vents 30, 32, 34, and a sensor opening 36. Within the constraints of the shape of the component 20 and it features, the network 22 is laid out to use the available space. The network 22 includes a number of channels 38, which in this embodiment generally run from the front 40 to the back 42 of the component 20. The channels 38 are connected with a manifold 44 that runs near the front 40 of the component 20 and another manifold 46 that runs near the rear 42 of the component 20. In the exemplary embodiment, the channels 38 are spaced from each other at twenty millimeters and have a diameter of 0.8 millimeters. A fluid may be circulated through the network 22, such as by being pumped into the manifold 44 at an inlet 48. From the inlet 48 the fluid travels through the manifold 44, the channels 38 and the manifold 46, which it exits at outlet 50. The fluid may be heated or chilled to change the temperature of the component 20. Given the component 20 is a dashboard in this embodiment, the radiative heat load experienced by a vehicle occupant is changed by circulating the fluid through the network 22.

Figure 2:
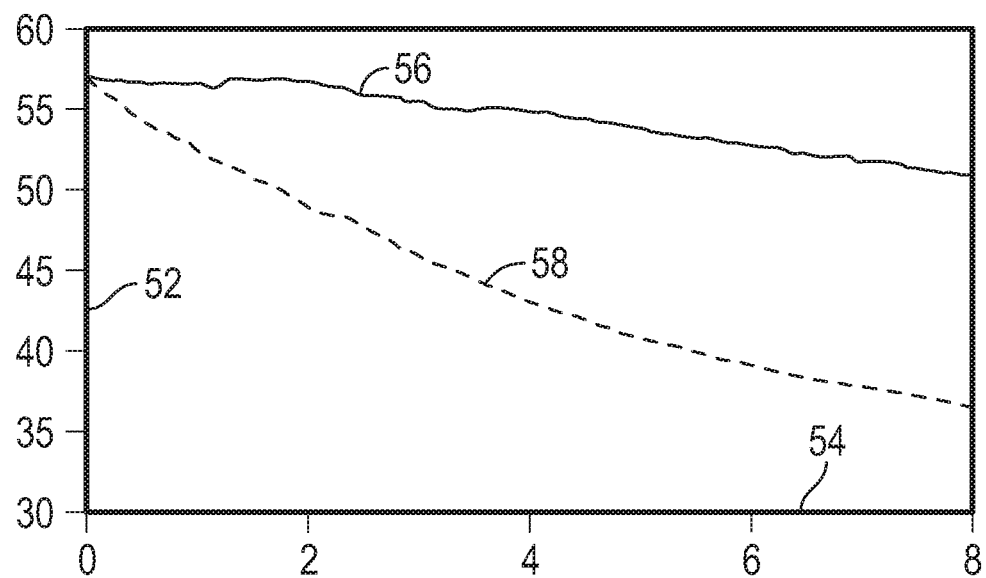
FIG. 2 is a graph of temperature versus time for the component of the embodiment of FIG. 1.
Figure 3:
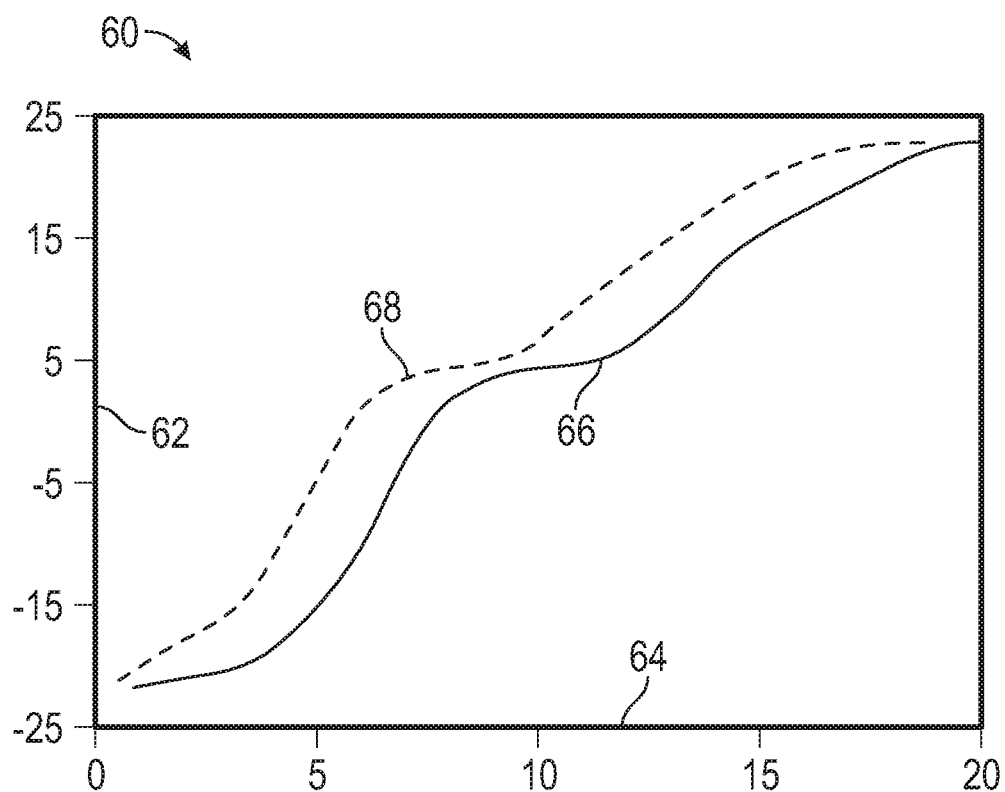
FIG. 3 is a graph of temperature versus time for a cabin that contains the component of the embodiment of FIG. 1.

With reference to FIG. 2, a graph is illustrated with dashboard temperature in degrees Celsius on the vertical axis 52 and time in minutes on the horizontal axis 54. In the exemplary embodiment, the fluid is circulated at a rate of 100 milliliters per minute at a temperature of ten degrees Celsius. Curve 56 demonstrates temperature reduction of the component 20 resulting from the vehicle's HVAC system cooling only. Curve 58 demonstrates temperature reduction of the component 20 resulting from the vehicle's HVAC system cooling along with cooling via the network 22. The greater rate of heat reduction achieved by the addition of cooling through the network 22 translates to a reduced heat load on the occupants due to reduced radiant heat from the component 20. The effect is to achieve an occupant comfort level more rapidly. This effect is also demonstrated by the graph 60 of FIG. 3 which illustrates time for the cabin of a vehicle to reach a comfortable temperature on a very cold day. The graph 60 depicts cabin temperature in degrees Celsius of the vertical axis 62 and time in minutes on the horizontal axis 64. Curve 66 depicts time to temperature of the cabin resulting from the vehicle's HVAC system heating only. Curve 68 depicts temperature of the cabin resulting from the vehicle's HVAC system heating along with heating via the network 22. The greater rate of temperature increase achieved by the addition of heating through the network 22 translates to a ten percent reduction in time to reach a comfortable temperature between the curves 68 and 66. Accordingly, the occupants experience a comfort level more quickly.

A number of embodiments involve manufacturing of vascular channels by direct formation of channels in a multi-layer component with selective localized bonding. With reference to FIG. 4-6, two layers are situated against one another. One of the layers may take the form of a component 102 for which heating or cooling action is desired. For example, the component 102 may be an interior panel of a cabin, a seating surface, a part of a floor, wall or ceiling, or another type of component. The component 102 may be formed from any of a variety of materials including metal, polymer, composite or others. Generally, the component 102 will be formed in its final shape at this stage, however in some embodiments, the component 102 may be subjected to further changes in form at a later stage. The second layer may take the form of a deformable sheet 104. As shown in FIG. 4, the component 102 and the deformable sheet 104 are placed together with a surface 106 of the component 102 against a surface 108 of the deformable sheet 104. The deformable sheet 104 may cover the entire surface 106, or may only cover a portion of the surface 106. In a number of embodiments, the component 102 may have a thickness 110 that is consistent. In other embodiments, the thickness 110 varies over the area of the component 102. The deformable sheet 104 generally has a consistent thickness 112 that is less than the thickness 110 of the component.

As shown in FIG. 5, a tool, which in this example takes the form of a die 111, is brought into contact with the deformable sheet 104. The die 111 has raised areas 114, which push the contacted areas of the deformable sheet 104 against the component 102 under the application of a force 116. In the interface areas 120, which correspond to the locations of the raised areas 114, the surface 108 is forced against the surface 106. The interface areas 120 may be selectively covered with an adhesive on the surface 108 and/or the surface 106. Application of the force 116 secures the deformable sheet 104 to the component 102 at the interface areas 120. In other embodiments, the die 111 is heated and the deformable sheet 104 is fused to the component 102 at the interface areas 120. The die 111 includes a number of depressions 122 between the raised areas 114. The pattern of the depressions 122 defines the channels that will be formed through the joined component 102 and deformable sheet 104. With reference to FIG. 6, a fluid pressure 124 is applied between the surfaces 106 and 108 to open passages between the interface areas 120 forming channels 126. The deformable sheet 104 may be plastically deformed under action of the pressure 124 leaving the channels 126 open. In other embodiments, the channels 126 are filled with fluid while the pressure 124 is applied and the fluid is left in the channels 126, without plastic deformation of the deformable sheet 104. In still other embodiments, the deformable sheet 104 is elastic and the channels 126 are inflated when a fluid is circulated through them when in use in the application.

In an exemplary embodiment as illustrated in FIGS. 7-8, the deformable sheet 104 is applied to the component 102 through a roll-on operation. The deformable sheet 104 is fed from a roll 128 onto the component 102. A roller 130 forces the deformable sheet 104 against the component 102 at the interface areas 120. The roller has raised areas 114 with depressions 122 formed between. The surface 108 is secured to the surface 106 at the interface areas 120 through an adhesive, or under the application of heat from the roller 130. In a number of embodiments, the deformable sheet 104 is pre-deformed with ridges 132 that fit within the depressions 122, obviating the need for pressurized deformation.

In an exemplary embodiment as illustrated in FIG. 9, the die 111 includes integrated heaters 136 in the raised areas 114. The die 111 also includes ports 137, which register with the depressions 122. A vacuum may be drawn through the ports 137 drawing the adjacent parts of the deformable sheet 104 into the depressions 122. The deformable sheet 104 and the component 102 are brought together under application of the force 116 and the interface areas 120 are secured by fusing under the applied heat while the vacuum is applied. In other embodiments, the deformable sheet is plastically deformed under the application of the vacuum, the vacuum is relieved, and the component 102 and deformable sheet 104 are then brought together, with the deformable sheet already deformed to form the channels 126.

Figure 10:
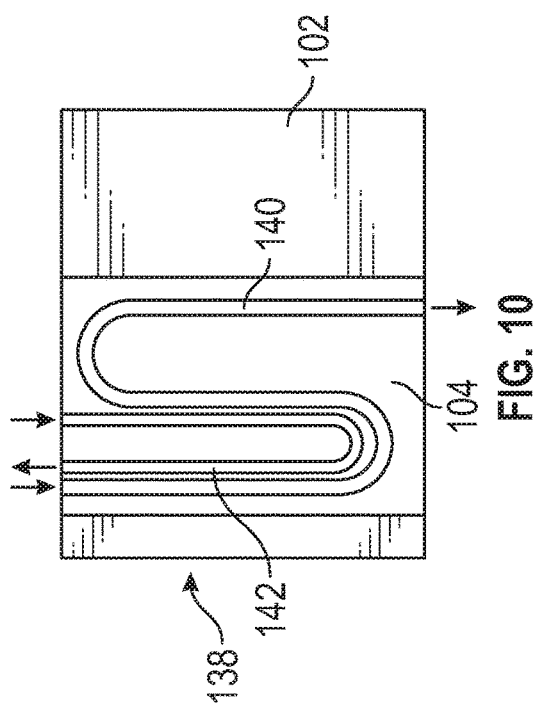
FIG. 10 is a schematic illustration of a component with vascular channels, in accordance with an embodiment.

In an exemplary embodiment as illustrated in FIG. 10, an assembly 138 of the component 102 and the deformable sheet 104 is formed with channels in multiple different flow paths 140, 142. The flow paths 140, 142 may be formed in independent networks, each with multiple paths, may have a counter-flow configuration, may carry different fluids, may carry fluids at different temperatures, may be controlled with different or alternate flow rates, and may vary in other ways. In some embodiments, areas of the assembly 138 are covered with channels of different densities to provide localized variations in heating or cooling. The flow paths 140, 142 may take any of a variety of shapes such as straight, curved, serpentine, etc.

Figure 11:
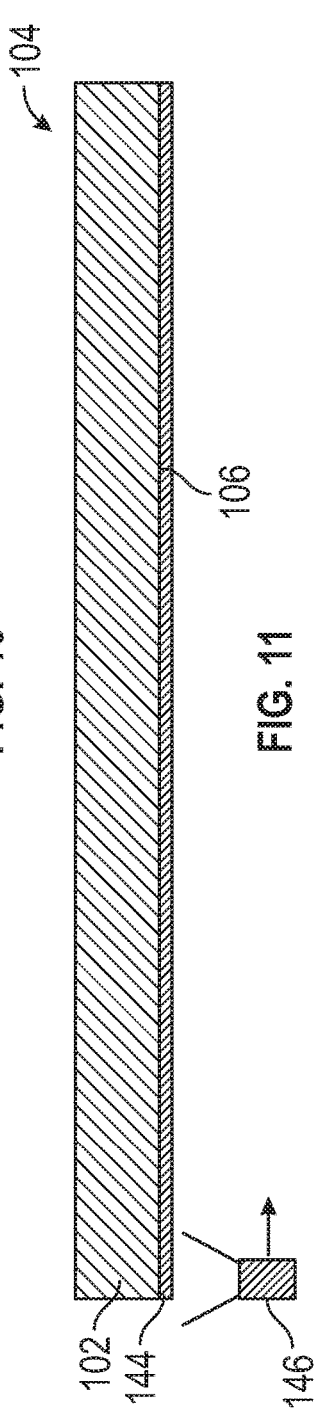
FIG. 11 is a schematic cross sectional illustration of an element of a component, in accordance with an embodiment.
Figure 12:
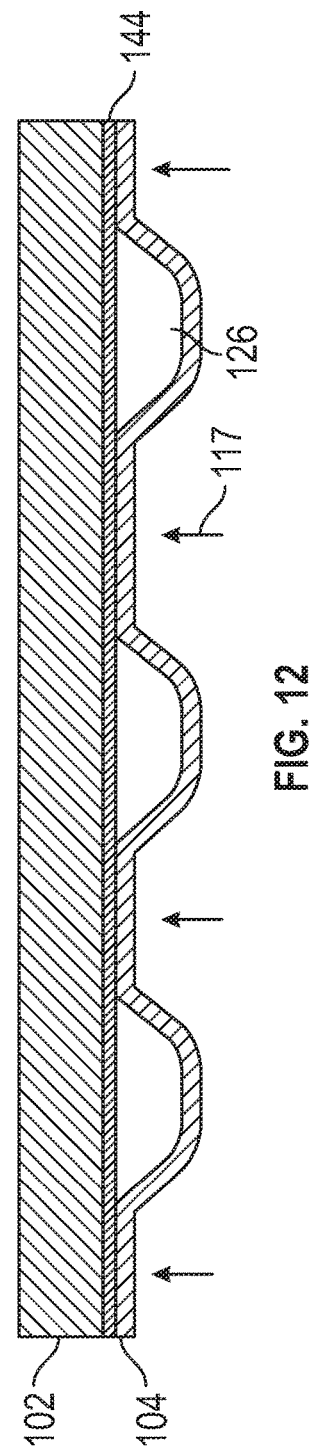
FIG. 12 is a schematic cross sectional illustration of the component of FIG. 11 with formed vascular channels, in accordance with an embodiment.

In an exemplary embodiment as illustrated in FIGS. 11-12, the component 104 is covered with an adhesive layer 144, such as by a spray applicator 146. The coverage may be consistent over the entire surface 106, or the adhesive may be applied to select areas. As shown in FIG. 12, the deformable sheet 104 may be pre-deformed and is applied against the adhesive layer 144 under an applied pressure 117. The deformable sheet 104 is secured to the component 102 by the adhesive layer 144 and the channels 126 are defined. In a number of embodiments as illustrated in FIGS. 13-14, in place of the adhesive layer 144, the surfaces 106, 108 are heated, such as by an infrared heater 147. The heater 147 is withdrawn and the pre-deformed deformable sheet 104 is brought against the component 102 under the application of the pressure 117, and the two are fused together defining the channels 126.

Figure 15:
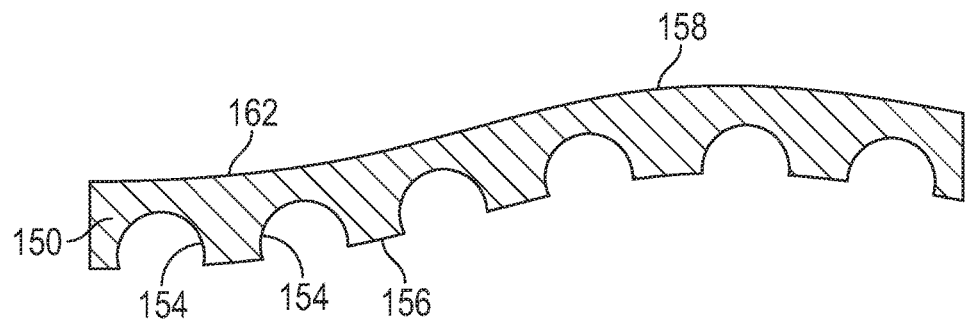
FIG. 15 is a schematic illustration of an element of a component, in accordance with an embodiment.
Figure 16:
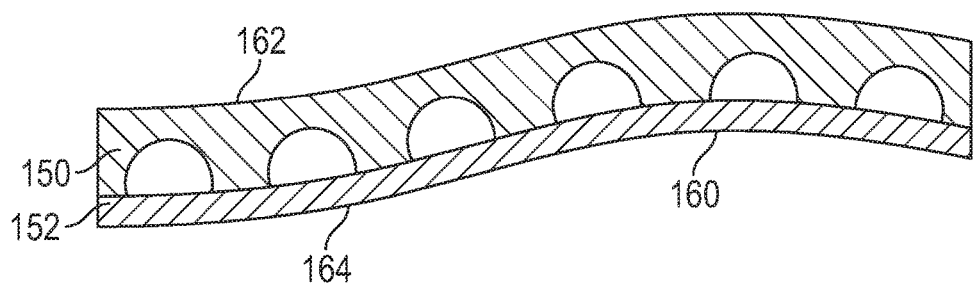
FIG. 16 is a schematic illustration of elements of the component of FIG. 15, in accordance with an embodiment.

In an exemplary embodiment as illustrated in FIGS. 15-16, an assembly is formed of two elements 150, 152. The element 150 is formed with depressions 154 between raised areas 156. The element 150 is contoured with a curved surface 158. The element 150 may be formed in a variety of ways, and in the current embodiment is formed by injection molding. The element 152 may also be formed in a variety of ways. The element 152 may be a flexible sheet or may be a rigid part. In some embodiments, the element 152 is formed by injection molding. The element 152 has a contour 160 matching the contour 158, which it may be formed to have, or which it may take on when applied to the element 150. The elements 150, 152 may be brought together and secured with an adhesive or thermally, as described above. In the current embodiment, either the surface 162 or the surface 164 may be the exposed surface, visible when assembled in its application. This is because the elements 150, 152 as produced by injection molding are formed without read-through of the channels through either surface 162, 164.

Figure 17:
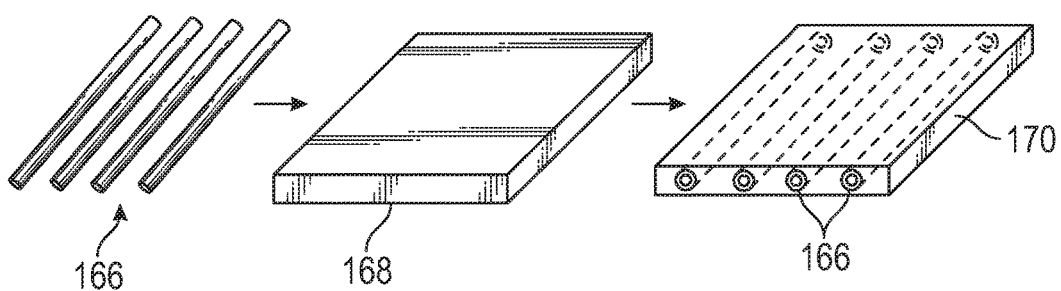
FIG. 17 is a schematic illustration of tube application to a component, in accordance with an embodiment.
Figure 18:
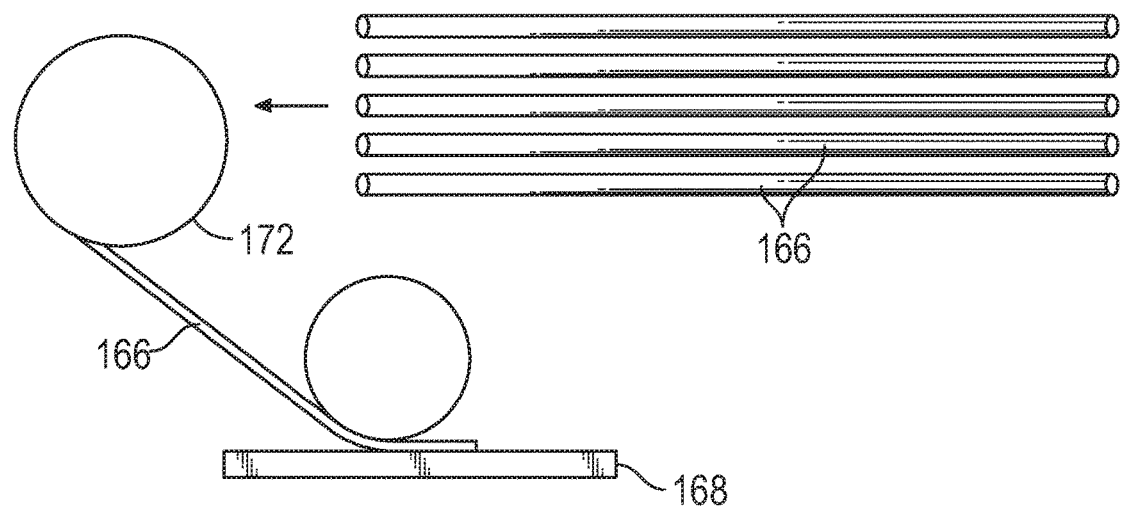
FIG. 18 is a schematic illustration of a tube application process for a component, in accordance with an embodiment.
Figure 19:
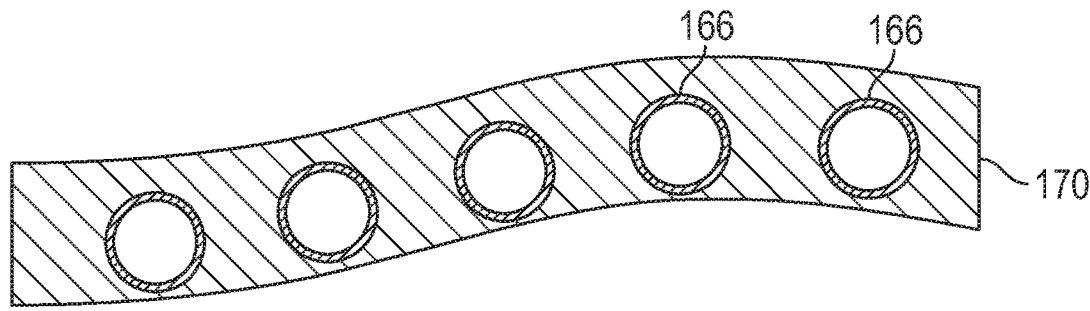
FIG. 19 is a schematic cross sectional illustration of the component of FIG. 18 with incorporated tubes, in accordance with an embodiment.

A number of embodiments involve manufacturing of products with vascular channels by the inclusion of tubes in a component. With reference to FIG. 17, a number of tubes 166 are arranged in a desired pattern for the heating or cooling effect that is needed. The tubes 166 may be of any viable size to meet the needs of the application. In a number of embodiments, the tubes 166 range from about 0.5 millimeter to about 5.0 millimeters in diameter. The tubes are laid in a mold 168 and a component 170 is molded around the tubes 166. In some embodiments as shown in FIG. 18, the tubes 166 are dispensed from a roll 172 and deposited in the mold 168. The resulting component 170, with the incorporated tubes 166 may take any desired shape, such as with nonlinear surfaces as shown in FIG. 19.

Figure 20:
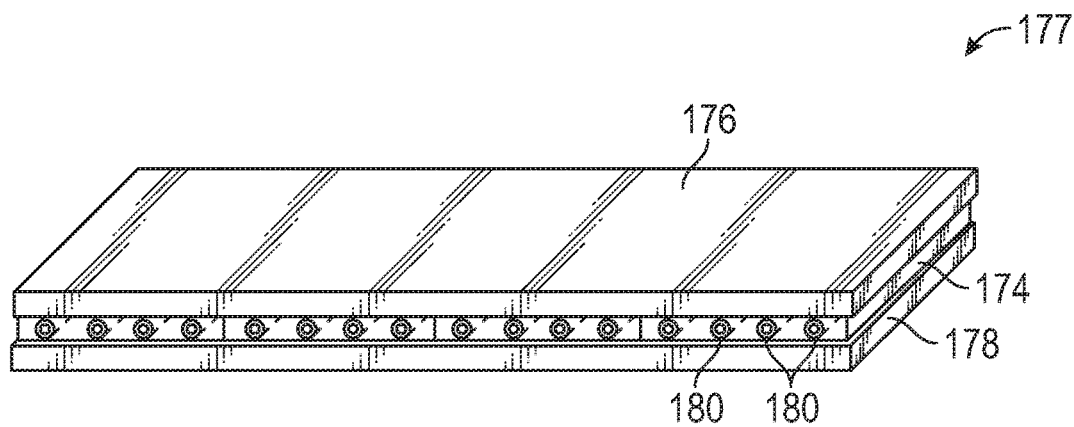
FIG. 20 is a schematic perspective illustration of a laminated component, in accordance with an embodiment.

In an exemplary embodiment as illustrated in FIG. 20, a laminated component is formed of a tube containing layer 174 disposed between a pair of external layers 176 and 178. In one example the component is a window such as the windshield 177 of an automobile. The external layers 176 and 178 are formed of glass and the tubes 180 and the tube containing layer 174 are formed of a transparent polymer such as polyvinyl butyral, ethylene-vinyl acetate, polycarbonate, thermoplastic polyurethane, Poly(methyl methacrylate), or another polymer. The tube containing layer 174, contains an index-matching material, which has an index of refraction that closely approximates that of the glass layers 176, 178. In the example of the windshield 177, which may transfer substantial radiant heat into the vehicle's cabin, a cooled fluid is circulated through the tubes 180 for cooling purposes. In other embodiments, the fluid is warmed, such as for defogging or defrosting purposes.

Figure 21:
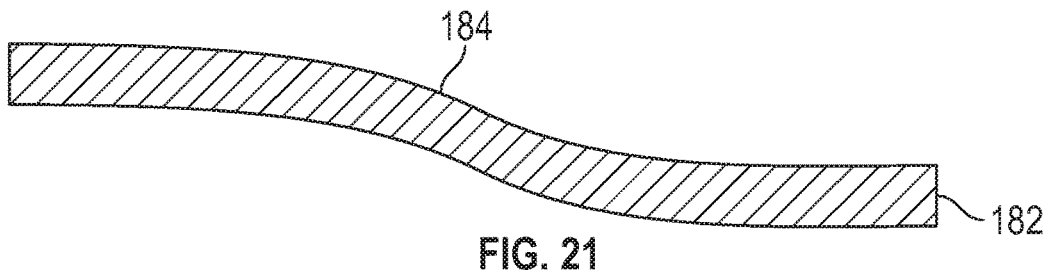
FIG. 21 is a schematic cross sectional illustration of a component, in accordance with an embodiment.
Figure 22:
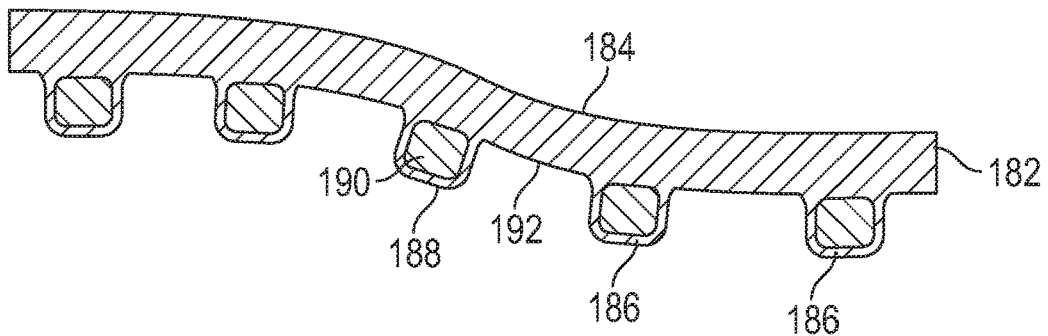
FIG. 22 is a schematic cross sectional illustration of the component of FIG. 21 with applied channel structures, in accordance with an embodiment.
Figure 23:
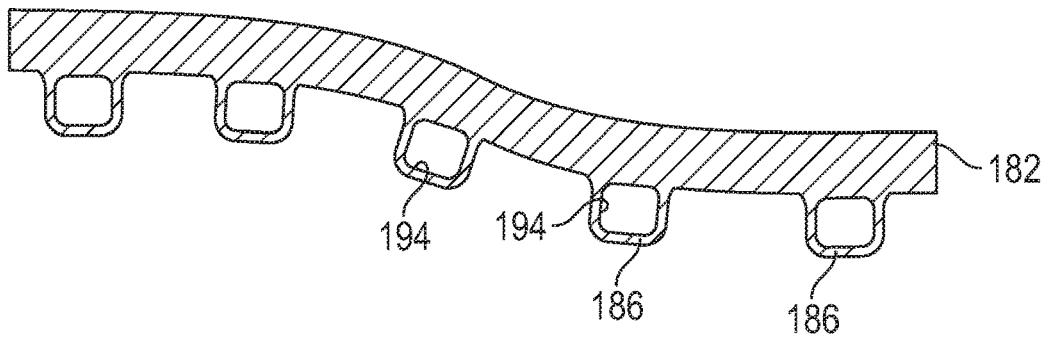
FIG. 23 is a schematic cross sectional illustration of the component of FIG. 21 with formed vascular channels, in accordance with an embodiment.

A number of embodiments involve manufacturing of products with vascular channels through the use of sacrificial materials. Using sacrificial materials enables forming channels with very small diameters. For example, diameters as small as 100 micrometers may be formed. With reference to FIG. 21, in an exemplary embodiment a component 182 is formed through various methods, such as through injection molding. The component 182 may be formed in any shape, and has a surface 184, which may be an appearance surface (class A surface), that is visible when the component 182 is assembled into a product. As shown in FIG. 22, channel structures 186 are created with stable outer wall 188 and sacrificial core 190. The channel structures 186 are placed and bonded, or formed onto a surface 192. The surface 192 is located in an unexposed area when the component 182 is assembled into a product. In one example, the channel structures 186 are printed onto the surface 192 encapsulating sacrificial fibers as the sacrificial core 190. The sacrificial core 190 is applied to the surface 192 as a sacrificial scaffold, and the wall 188 is deposited in layers and built up to a structurally sufficient thickness for the pressures that will be applied within the formed channels. As shown in FIG. 23, the sacrificial core 190 is depleted and the walls 188 form channels 194. The material of the sacrificial core 190 may be removed by thermal, chemical, electrical, ultraviolet, or other action depending on the specific material used. In one example, the sacrificial cores 190 are formed from catalyst impregnated polylactide and removed by vaporization at elevated temperature.

Figure 24:
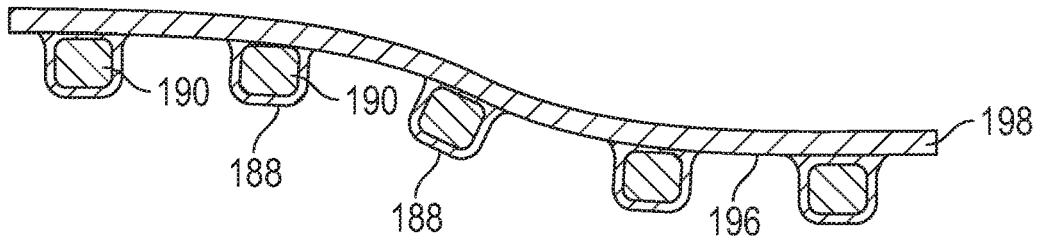
FIG. 24 is a schematic cross sectional illustration of a mold with applied channel structures, in accordance with an embodiment.
Figure 25:
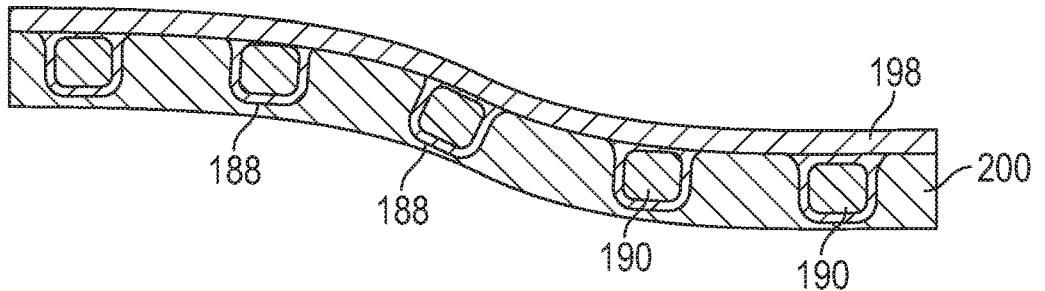
FIG. 25 is a schematic cross sectional illustration of a component added to the channel structures and mold of FIG. 24, in accordance with an embodiment.
Figure 26:
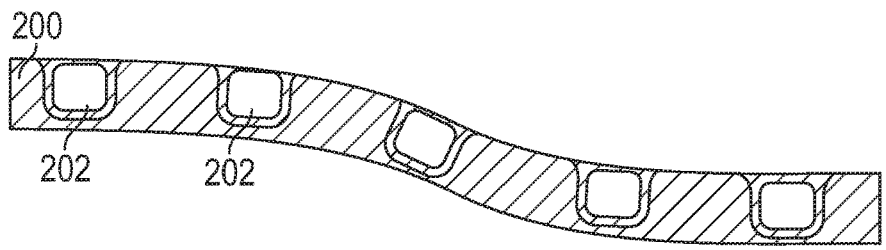
FIG. 26 is a schematic cross sectional illustration of the component of FIG. 25 with formed vascular channels, in accordance with an embodiment.

In an exemplary embodiment as illustrated in FIG. 24, the walls 188, are printed onto a surface 196 of a mold 198 encapsulating the sacrificial cores 190. As shown in FIG. 25, a component 200 is formed on the mold 198, such as through injection molding over the walls 188. The component 200 is formed around the sacrificial cores 190 and the walls 188. As shown in FIG. 26, the sacrificial cores 190 are depleted and channels 202 are formed in the component 200. The walls 188 may be formed from the same material as the component 200 and become an integral part thereof.

Figure 27:
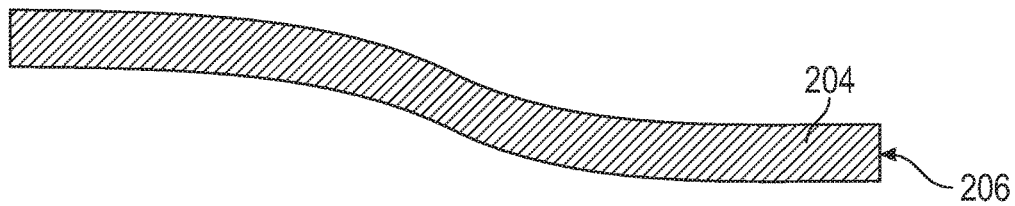
FIG. 27 is a schematic cross sectional illustration of an element of a component, in accordance with an embodiment.
Figure 28:
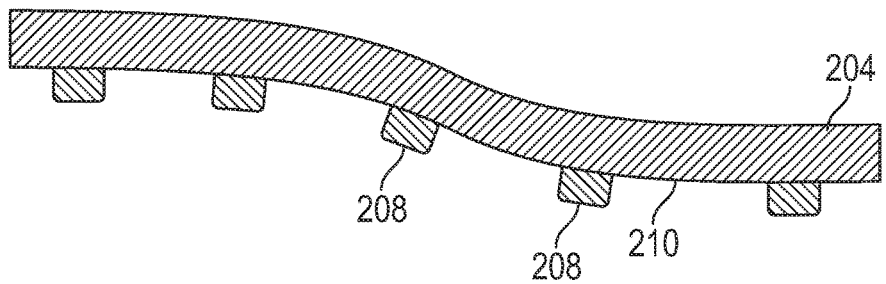
FIG. 28 is a schematic cross sectional illustration of the element of FIG. 27 with applied tracks of sacrificial material, in accordance with an embodiment.
Figure 29:
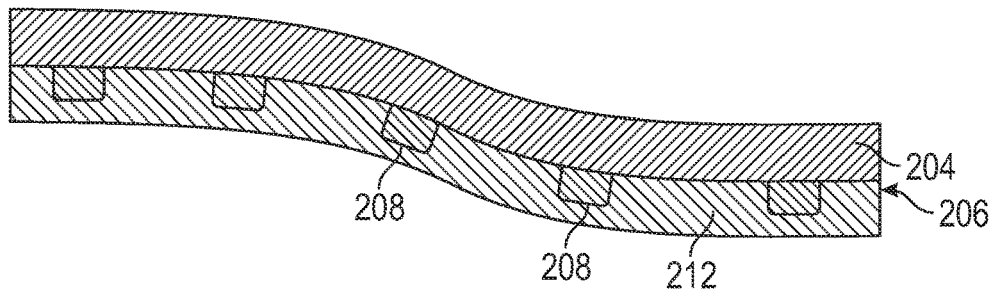
FIG. 29 is a schematic cross sectional illustration of the element of FIG. 27 with applied tracks of sacrificial material and another element forming a component, in accordance with an embodiment.
Figure 30:
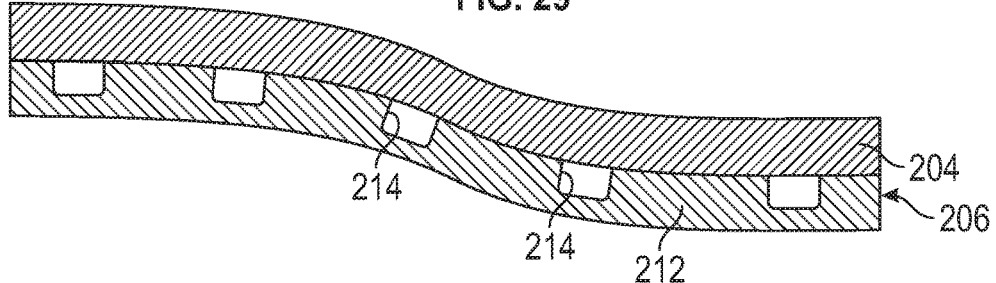
FIG. 30 is a schematic cross sectional illustration of the component of FIG. 29 with formed vascular channels, in accordance with an embodiment.

In an exemplary embodiment as illustrated in FIG. 27 an element 204 of a component 206 is formed from a variety of methods. In this example the element 204 is formed by injection molding. A number of tracks 208 of sacrificial material are printed onto a surface 210 of the element 204 as shown in FIG. 28. Another element 212 of the component 206 is formed on the element 204 overmolded on the tracks 208 as shown in FIG. 29. In the current example, the element 212 is formed by injection molding. The tracks 208 of sacrificial material are removed as shown in FIG. 30, such as by thermal, chemical, electrical, ultraviolet, or other action, depending on the specific material used. Channels 214 are formed in the component 206 by removal of the tracks 208 of sacrificial material.

Figure 31:
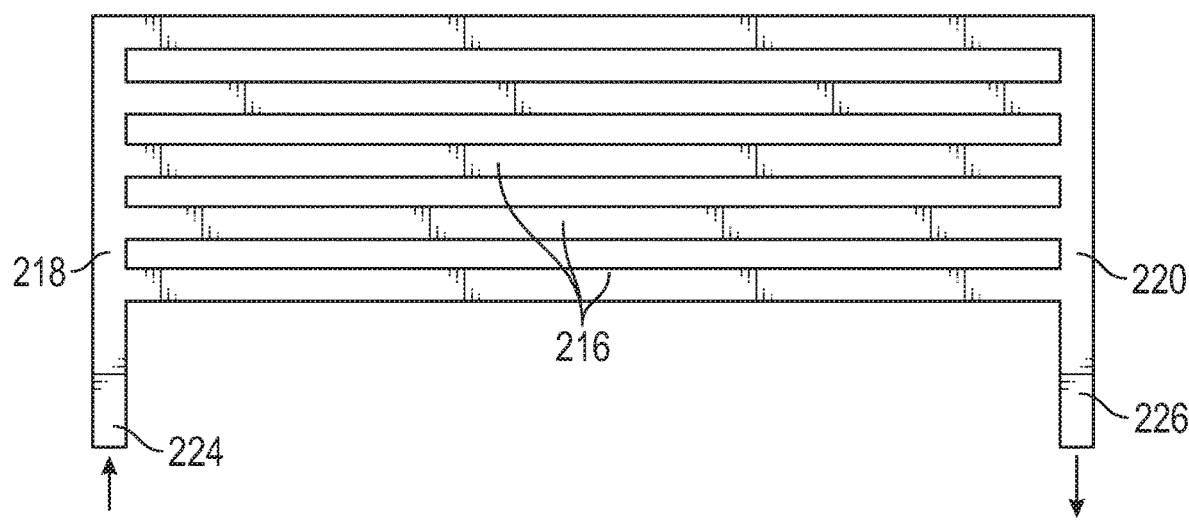
FIG. 31 is a schematic illustration of a sacrificial material formed into tracks connected with sacrificial manifolds, in accordance with an embodiment.
Figure 32:
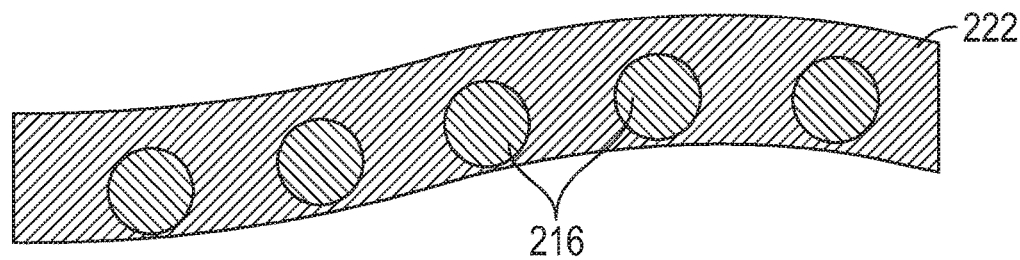
FIG. 32 is a schematic cross sectional illustration of the tracks of FIG. 31 with a formed component.
Figure 33:
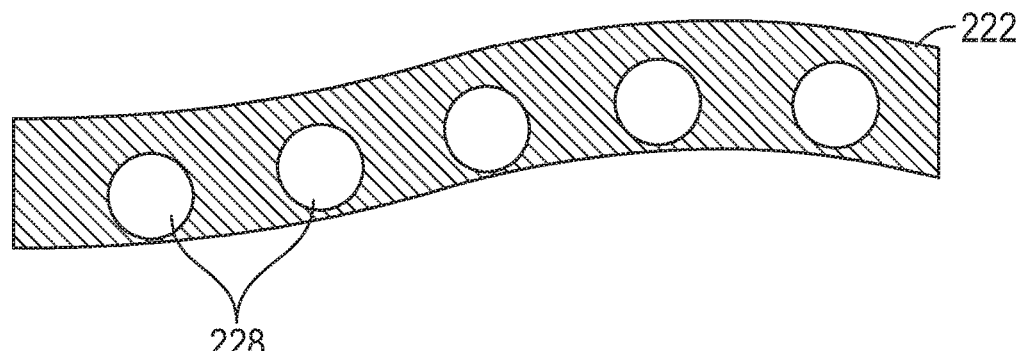
FIG. 33 is a schematic cross sectional illustration of the component of FIG. 32 with formed vascular channels, in accordance with an embodiment.

A number of embodiments involve manufacturing of products with manifolds to connect the vascular channels through the use of sacrificial materials. In an exemplary embodiment as shown in FIG. 31, a number of tracks 216 of sacrificial material are formed through any of the methods described above including injection molding, 3D printing, and other methods. The tracks 216 are connected with a pair of manifolds 218 and 220. The manifold 218 connects with one end of each of the tracks 216 and the manifold 220 connects with the opposite ends of each of the tracks 216. In this embodiment, the tracks 216 and the manifolds 218, 220 are formed into a component 222 as shown in FIG. 32. The component 222 may be formed by any of the methods described above, including injection molding. The ends 224, 226 of the manifolds 218, 220 respectively, are left accessible for connection with a fluid circulation system. The component is treated to deplete the sacrificial material of the tracks 216, such as through thermal, chemical, electrical, ultraviolet, or other action. Removal of the sacrificial material tracks 216 leaves channels 228 in the component 222 as shown in FIG. 33.

Figure 34:
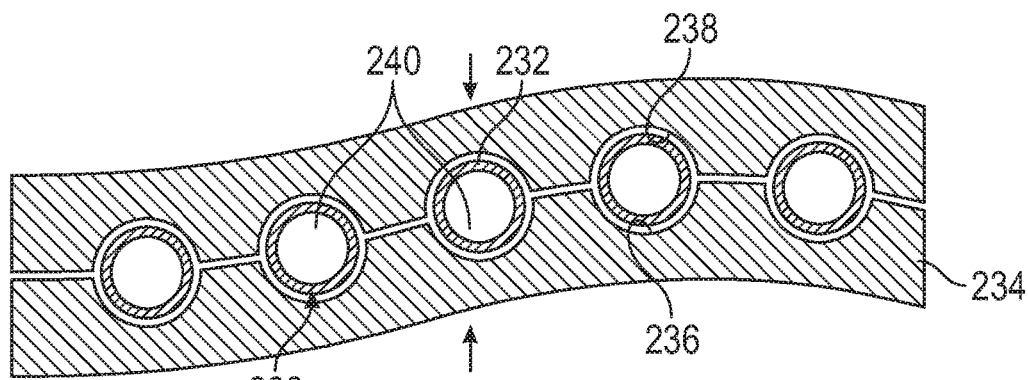
FIG. 34 is a schematic cross sectional illustration of a blow molding operation, in accordance with an embodiment.
Figure 35:
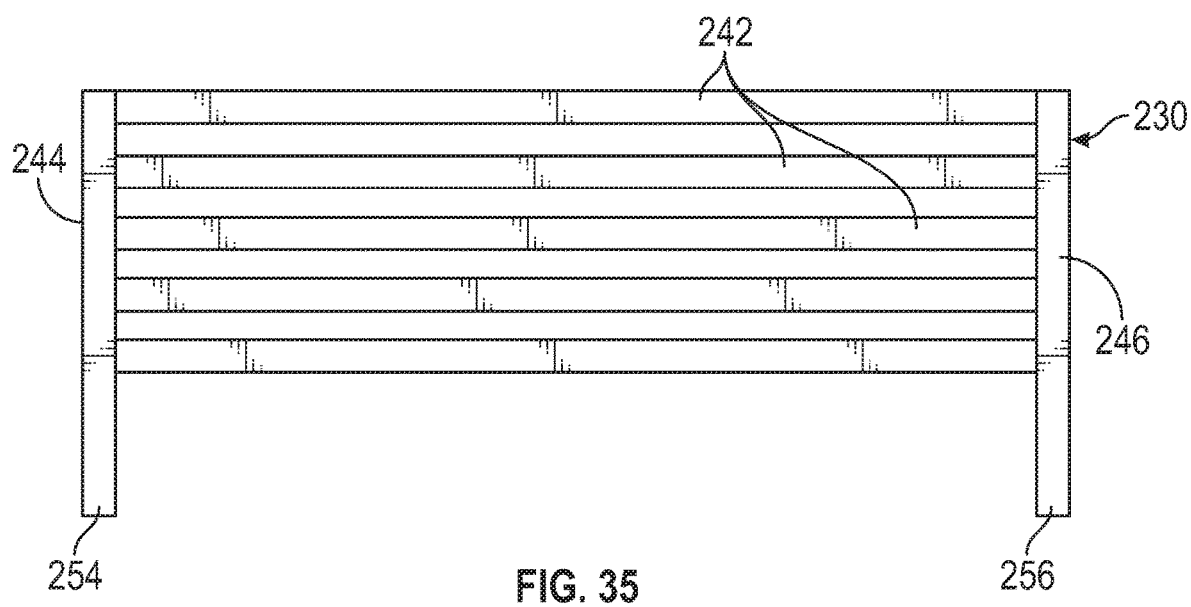
FIG. 35 is a schematic cross sectional illustration of a vascular channel preform, in accordance with an embodiment.
Figure 36:
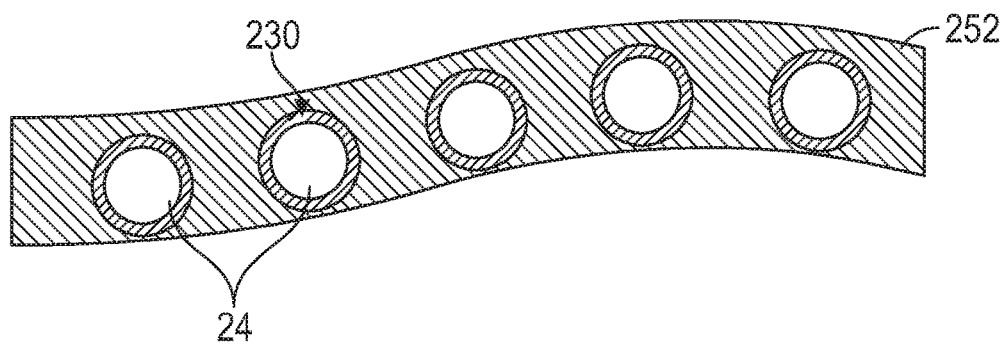
FIG. 36 is a schematic cross sectional illustration of the preform of FIG. 35 incorporated into a component, in accordance with an embodiment.

A number of embodiments involve manufacturing of products with manifolds to connect the vascular channels by preforming manifolds. As shown in FIG. 34 a network 230 is formed through any of the methods described above including injection molding, 3D printing, and other methods. In an exemplary embodiment, the network 230 is formed by blow molding. A heated polymer material 232 is injected into a mold 234 that has the network configuration formed in its interior surfaces 236, 238. Air is blown into the mold 234 forming voids 240 in the polymer material 232. The mold 234 is opened and the network 230 is extracted and is configured as shown in FIG. 35. The network 230 includes a number of blow molded tubular elements 242 connected with a pair of manifolds 244 and 246. The network 230 is closed except at the ends 248, 250 of the manifolds 244, 246 respectively. The manifold 244 connects with one end of each of the tubular elements 242 and the manifold 246 connects with the opposite ends of each of the tubular elements 242. The tubular elements 242 and the manifolds 244, 246 are formed into a component 252 as shown in FIG. 36. The component 252 may be formed by any of the methods described above, including injection molding. The ends 254, 256 of the manifolds 244, 246 respectively, are left accessible for connection with a fluid circulation system. The network 230 may be formed in any configuration needed for the circulation of a fluid or multiple fluids through the component 252.

In various examples the components descried above are formed of materials such as metals, polymers and/or compounds. In various examples components are formed of a metal such as steel, aluminum alloy, magnesium alloys, or others. In various examples a polymer such as a thermoset or thermoplastic is used. Example polymers include, but are not limited to: Acrylonitrile butadiene styrene (ABS), Polymethyl Methacrylate (PMMA), Celluloid, Cellulose acetate, Cycloolefin Copolymer (COC), Benzoxazine, Bis-Maleimides (BMI), Cyanate esters, Epoxy, Ethylene-Vinyl Acetate (EVA), Ethylene vinyl alcohol (EVOH), Fluoroplastics (including PTFE, FEP, PFA, CTFE, ECTFE, ETFE), Phenioc (PF), Polyacetal (POM or Acetal), Polyacrylates (Acrylic), Polyacrylonitrile (PAN or Acrylonitrile), Polyamide (PA or Nylon), Polyamide-imide (PAI), Polyaryletherketone (PAEK or Ketone), Polybutadiene (PBD), Polybutylene (PB), Polybutylene terephthalate (PBT), Polycaprolactone (PCL), Polychlorotrifluoroethylene (PCTFE), Polyethylene terephthalate (PET), Polycyclohexylene dimethylene terephthalate (PCT), Polycarbonate (PC), Polyhydroxyalkanoates (PHAs), Polyketone (PK), Polyester, Polyetheretherketone (PEEK), Polyetherketoneketone (PEKK), Polyetherimide (PEI), Polyethersulfone (PES), Polysulfone, Polyethylenechlorinates (PEC), Polyimide (PI), Polylactic acid (PLA), Polymethylpentene (PMP), Polyphenylene oxide (PPO), Polyphenylene sulfide (PPS), Polyphthalamide (PPA), Polystyrene (PS), Polysulfone (PSU), Polytrimethylene terephthalate (PTT), Polyurethane (PU), Polyvinyl acetate (PVA), Polyvinyl chloride (PVC), Polyvinylidene chloride (PVDC), Styrene-acrylonitrile (SAN), polycarbonate+acrylonitrile butadiene styrene mix (ABS+PC), Polypropylene (PP), Polyethylene (PE), unsaturated Polyester, Polyeurethane (PUR), Vinyl ester, Silcone, or combinations or blends in any amount thereof, or may be another type. In various examples, compounds with a fibrous material incorporated into a matrix material of a polymer is used. Fibers may be carbon, glass, para-aramid, meta-aramid, basalt, Polyethylene, combinations thereof, or another material. The components are formed through any process appropriate for the materials selected.

Figure 37:
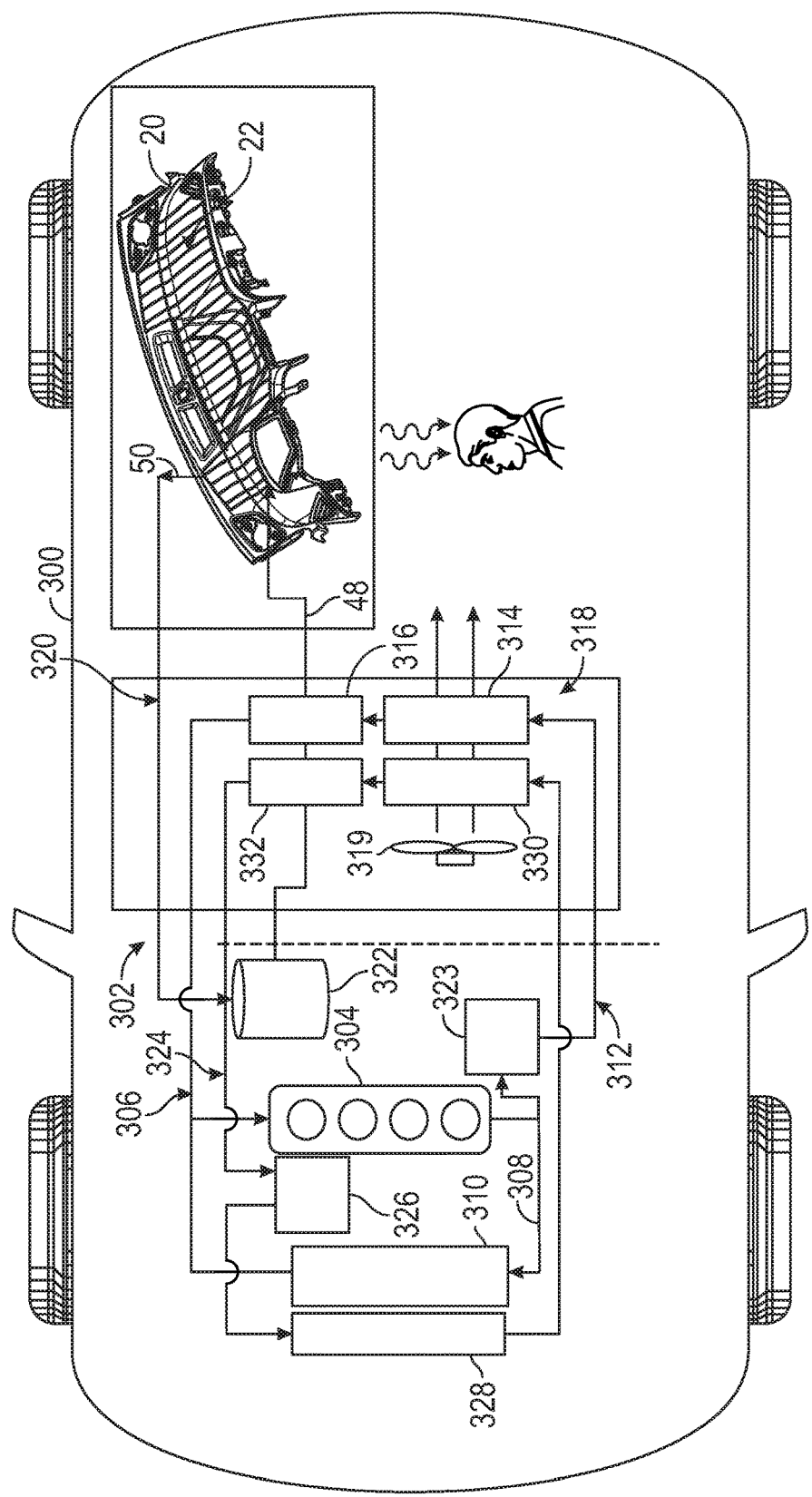
FIG. 37 is a schematic illustration of a vehicle vascular channel fluid system, in accordance with an embodiment.

In a number of embodiments as illustrated in FIG. 37, a vehicle 300 includes a vascular channel fluid system 302. The component 20, in the form of a vehicle dashboard, includes the network 22 with an inlet 48 and an outlet 50. The vehicle 300 includes an engine 304 with a coolant circuit 306. Generally, coolant is circulated through one branch 308 from the engine 304 through the radiator 310 to expel heat. Coolant is circulated through another branch 312 from the engine 304 through a heater core 314 and a heat exchanger 316. The heater core 314 is part of the HVAC system 318 and the heat exchanger 316 is part of the vascular channel fluid system 302. The HVAC system includes a blower 319 for moving air. The vascular channel fluid system 302 includes a fluid circuit 320 which includes a pump 322 for circulating fluid through the network 22 and the heat exchanger 316. The pump 322 may be a small efficient device such as a twenty-watt pump. To raise the temperature of the component 222, coolant heated by the engine 304 is circulated through the branch 312 warming the heat exchanger 316. Heat may be simultaneously used in the HVAC system 318 given that the coolant flows through the heater core 314 in series with the heat exchanger 316. A control mechanism 323 which may include an auxiliary pump, valves or other flow control components may be included in the branch 312 to control flow therethrough. With the heat exchanger 316 heated by the coolant, fluid is moved through the network 22 by the pump 322 warming the component 20.

The vehicle 300 also includes an air conditioning system 324. Refrigerant is circulated by a compressor 326, through a condenser 328, an evaporator 330 and a heat exchanger 332. The condenser 328 is part of the HVAC system 318 and the heat exchanger 332 is part of the vascular channel fluid system 302. The heat exchangers 316, 332 are arranged in series in the vascular channel fluid system 302. To lower the temperature of the component 22, refrigerant that is still cool from the evaporator 330 is circulated through the heat exchanger 332 providing cooling. Cooling may be simultaneously used in the HVAC system 318 given the refrigerant is expanded through the evaporator 330. With the heat exchanger 332 cooled by the refrigerant, fluid is moved through the network 22 by the pump 322 cooling the component 20. Accordingly, the vascular channels provide an efficient form of thermal control of the component 20.

Figure 38:
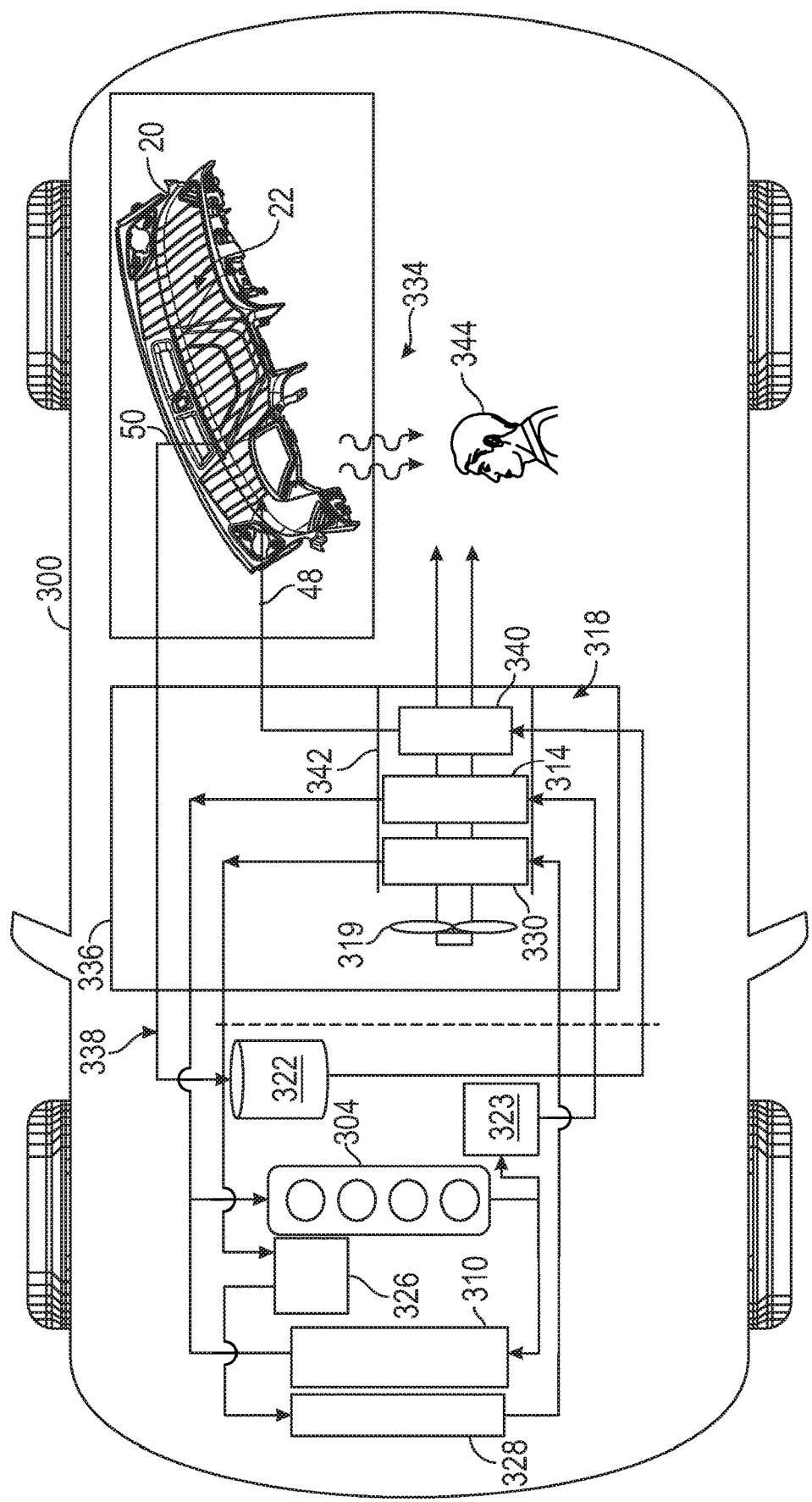
FIG. 38 is a schematic illustration of a vehicle vascular channel fluid system, in accordance with an embodiment.

In a number of embodiments as illustrated in FIG. 38, parts of a vascular channel fluid system 334 are incorporated into a HVAC module 336. The HVAC module 336 includes the blower 319, the evaporator 330 and the heater core 314. A fluid circuit 338 circulates fluid through the network 22 and through a heat exchanger 340 by selective operation of the pump 322. The heat exchanger 340 is included in the HVAC module 336 in a common duct 342 with the evaporator 330 and the heater core 314. The blower 319 moves air through the duct 342 over the evaporator 330, the heater core 314 and the heat exchanger 340, which are arranged in series. The air is then delivered to the cabin 344 of the vehicle 300. The air moving through the duct 342 is cooled by the evaporator 330 when the HVAC system 318 is operating in air conditioner mode and is heated when the HVAC system is operating in heater mode. The cooled or heated air moves over the heat exchanger 340 applying either a cooling or a heating effect. The fluid in the fluid circuit 338 is circulated through the heat exchanger 340 picking up heat when the HVAC system 318 is operating in heater mode and giving up heat when the HVAC system 318 is operating in air conditioner mode. The warmed or cooled fluid in the fluid circuit 338 is then circulated through the network 22 either warming or cooling the component 20.

Figure 39:
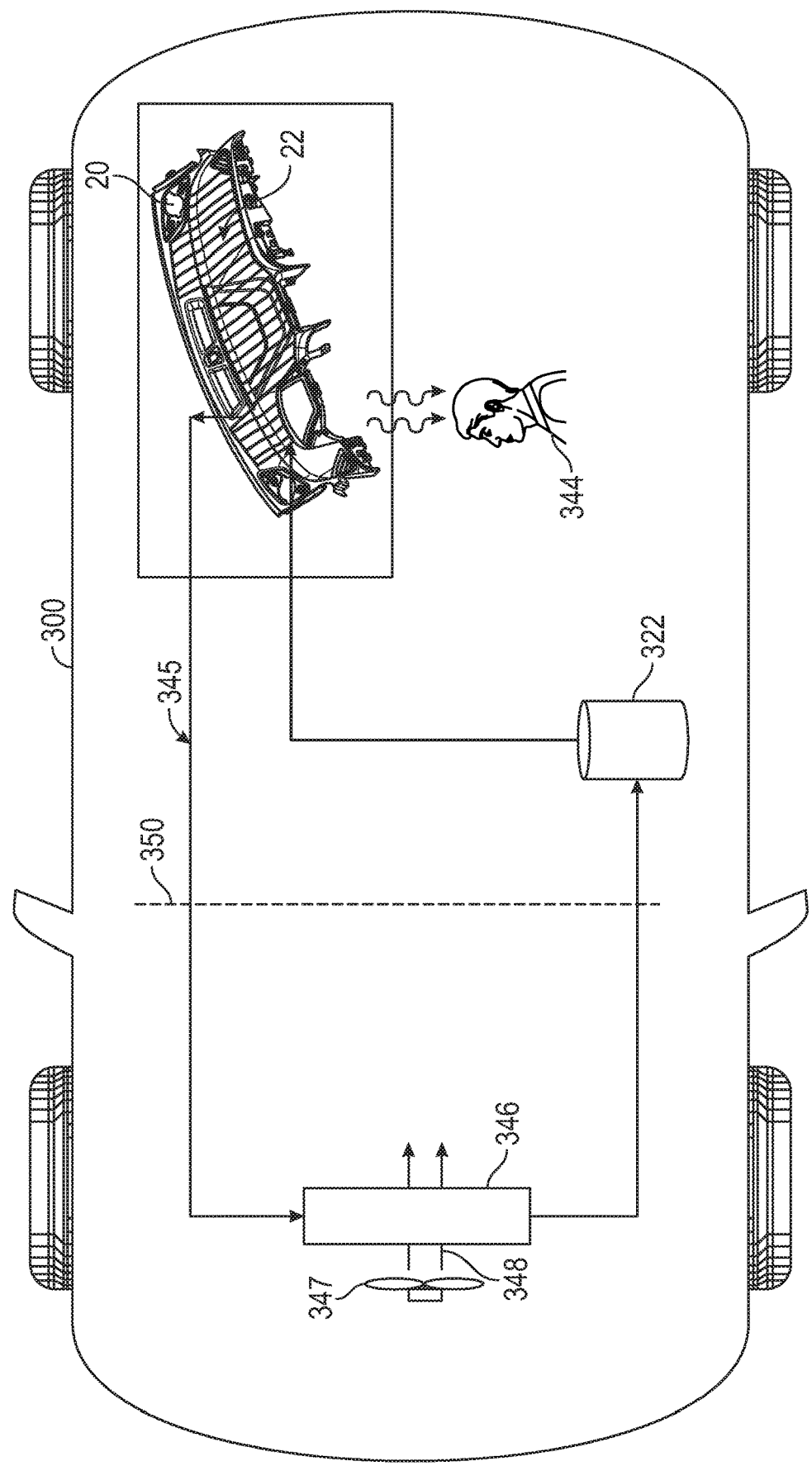
FIG. 39 is a schematic illustration of a vehicle vascular channel fluid system, in accordance with an embodiment.

In a number of embodiments as illustrated in FIG. 39, the network 22 is part of a fluid circuit 345 that includes a radiator type heat exchanger 346 and the pump 322. A blower 347 moves ambient air 348 through the heat exchanger 346 and will either provide a heating or cooling effect depending on the temperature of the ambient air 348 and that of the component 20. For example, when the cabin 344 has an elevated temperature, such as due to a solar load when the vehicle 300 is parked, the fluid circuit 345 is used to cool the component 20. Fluid circulated through the fluid circuit 345 by the pump 322 picks up heat in the network 22 and expels heat through the heat exchanger 346 to the ambient air 348. The heat exchanger 348 is located forward of the front-of-dash area 350 of the vehicle 300, and is situated to receive a supply of ambient air 348.

Figure 40:
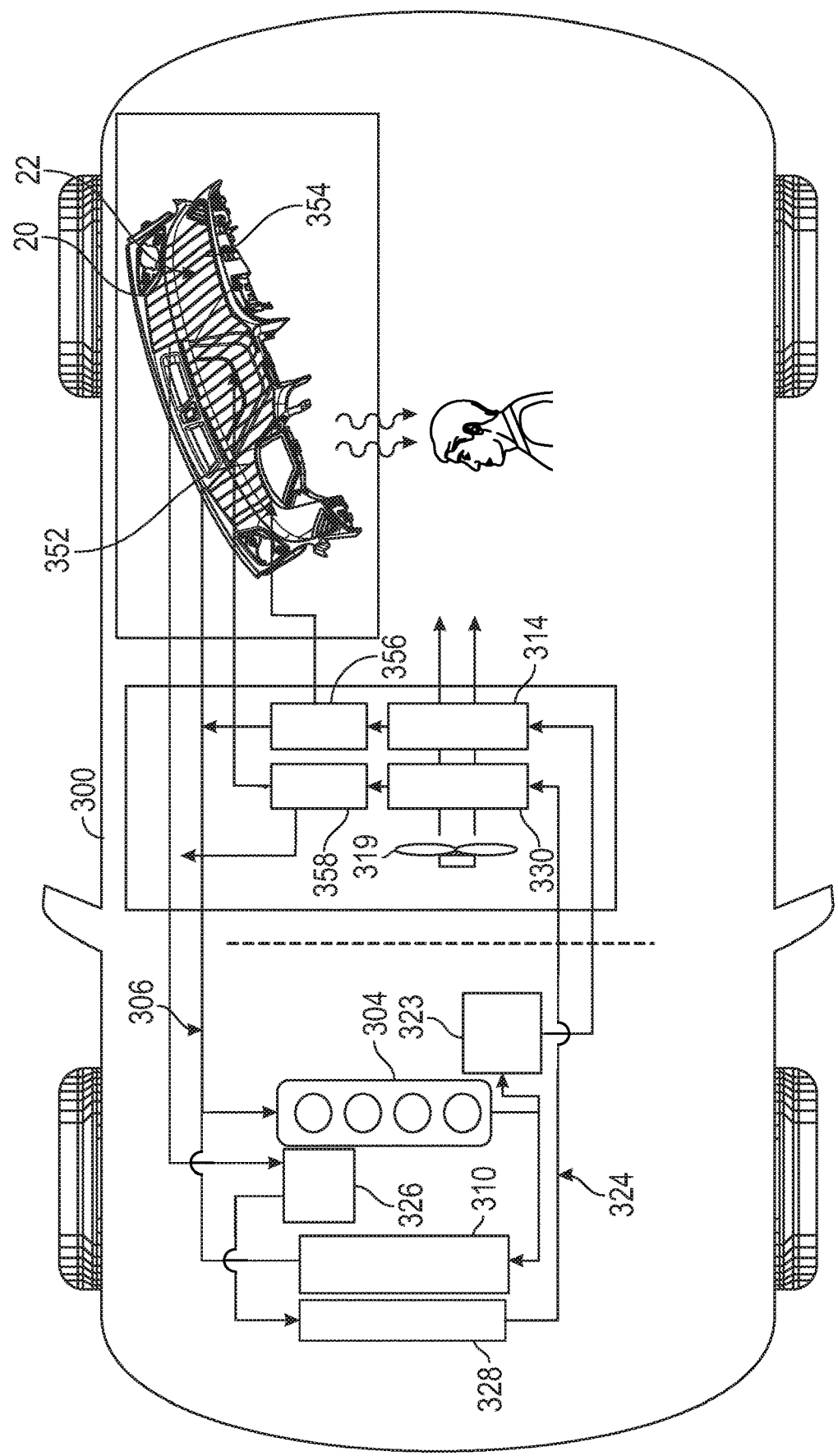
FIG. 40 is a schematic illustration of a vehicle vascular channel fluid system, in accordance with an embodiment.

In a number of embodiments as illustrated in FIG. 40, the network 22 is selectively connected with the coolant circuit 306 or the air conditioning system 324. The network 22 is divided into two separate fluid loops 352, 354 to maintain separation between the coolant and refrigerant fluids. The fluid loops 352, 354 may be disposed in separate regions of the component 20, or may be segregated but distributed over the same area. A valve 356 controls the flow of coolant into the fluid loop 352. Coolant heated by the engine 304 flows through the heater core 314 and when open, through the valve 356 and into the fluid loop 352 to warm the component 20. A valve 358 controls the flow of refrigerant into the fluid loop 354. Refrigerant compressed by the compressor 326 flows through the evaporator 330 and when open, through the valve 358 and into the fluid loop 354 to cool the component 20.

Through the foregoing structures, systems and methods, vascular channels provide an efficient form of thermal control. While certain exemplary embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A thermal control system for a vehicle comprising:
   a component comprising an interior panel of the vehicle, wherein the component defines an interior part of a cabin of the vehicle that has an inner layer comprising a class A appearance surface visible when the component is assembled in the vehicle;
   vascular channels incorporated in a network within the component, wherein the vascular channels are open to the inner layer;
   a fluid circuit connected with the vascular channels and configured to circulate a fluid through the component; wherein the fluid alters a thermal state of the component by direct contact with the inner layer so that the component changes a heat load within the cabin.

2. The thermal control system of claim 1 wherein the component is an interior panel of the vehicle that defines a surrounding of at least a part of the cabin wherein the class A appearance surface is exposed to the cabin with an aesthetic appearance, and wherein the fluid circuit is configured to alter the thermal state by internally changing a temperature of the component.

3. The thermal control system of claim 1 comprising:
   a heat exchanger, wherein the fluid circuit includes the heat exchanger; and
   a heating-ventilation and air conditioning (HVAC) system configured to circulate a second fluid, wherein the second fluid is circulated through the heat exchanger.

4. The thermal control system of claim 1 wherein the component comprises a vehicle dashboard, wherein the packaging space and functional requirements are dictated the component as a vehicle dashboard, and wherein the vascular channels extend through the vehicle dashboard.

5. A thermal control system for a cabin of a vehicle comprising:
   a component of the vehicle, wherein the component comprises a size and shape that defines an interior part of the cabin, wherein the component is configured to fit packaging space and functional requirements of an interior occupant facing panel of the vehicle, wherein the size, shape and functional requirements are unrelated to thermal control, the component including a layer comprising an appearance surface visible when the component is assembled in the vehicle, wherein the component includes a layer of material that defines the appearance surface;
a fluid circuit configured to circulate a fluid;
a vascular channel in the layer of material and connected with the fluid circuit, wherein the vascular channel is configured to channel the fluid through the component, wherein the component includes contours dictated by the packaging space and functional requirements, and wherein the vascular channels follow the contours; and
a heat exchanger carried by the vehicle, wherein the fluid circuit includes the heat exchanger;
wherein the fluid is configured to alter a thermal state of the component to increase or decrease a temperature of the cabin.

6. The thermal control system of claim 5 wherein the component comprises a vehicle windshield, wherein the vascular channels are defined by tubes of a transparent polymer and extend through the vehicle windshield.

7. The thermal control system of claim 1 comprising a second layer selective bonded to the inner layer at localized bonding areas, wherein the vascular channels are defined by the inner layer and the second layer and between the localized bonding areas.

8. The thermal control system of claim 1 wherein the vascular channels comprise tubes embedded in the component, wherein the tubes follow a shape and a contour of the component within constraints of the shape and features of the component including extending around openings of the component.

9. The thermal control system of claim 1 wherein the network comprises a manifold embedded in the component and connected with the vascular channels, wherein the manifold is embedded in the component.

10. The thermal control system of claim 1 wherein the component comprises a fiber material incorporated in a polymer matrix, and wherein the component defines openings wherein the vascular channels are arranged in a network in the component, the network including a number of channels running between a pair of manifolds positioned at edges of the component, wherein the manifolds that are laid out to avoid the openings.

11. The thermal control system of claim 1 comprising:
a first heat exchanger, wherein the fluid circuit includes the heat exchanger;
a heating-ventilation and air conditioning (HVAC) system configured to circulate air in the cabin, wherein the air is circulated through the first heat exchanger, a second heat exchanger and a third heat exchanger;
a coolant circuit of the HVAC system containing engine coolant and configured to circulate the engine coolant through the second heat exchanger;
an air conditioning system configured to circulate a refrigerant including through the third heat exchanger;
wherein the first heat exchanger is downstream from the second and third heat exchangers for air circulation.

* * * * *